F. VOGELZANG.
DENTAL INSTRUMENT.
APPLICATION FILED AUG. 6, 1920.
1,378,433. Patented May 17, 1921.
2 SHEETS—SHEET 1.
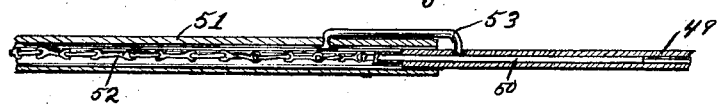
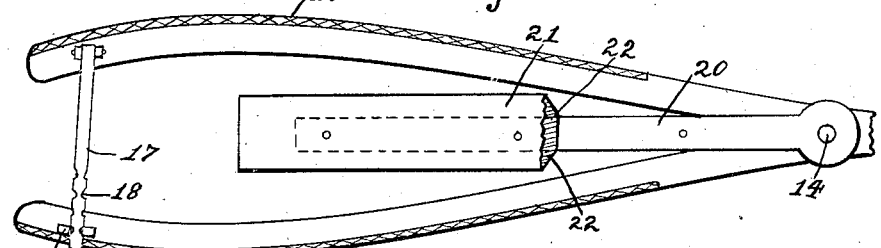
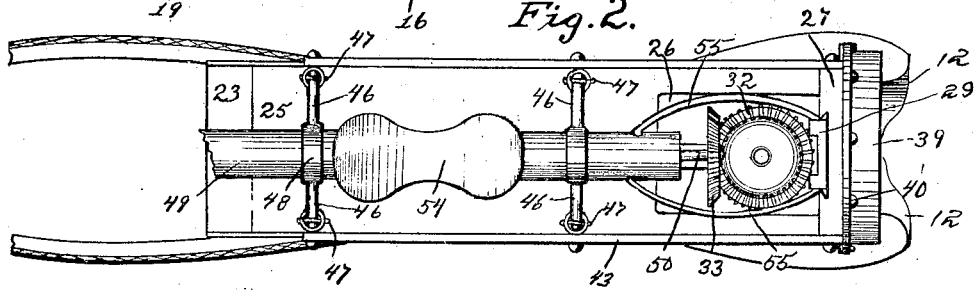
Witness.
Roy Kison.
Inventor.
Frank Vogelzang.
By Orwig & Bair. Attorneys.

F. VOGELZANG.
DENTAL INSTRUMENT.
APPLICATION FILED AUG. 6, 1920.
1,378,433.
Patented May 17, 1921.
2 SHEETS—SHEET 2.
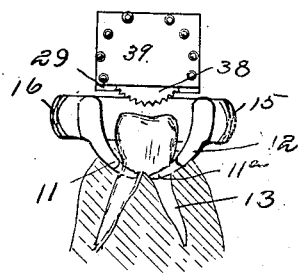
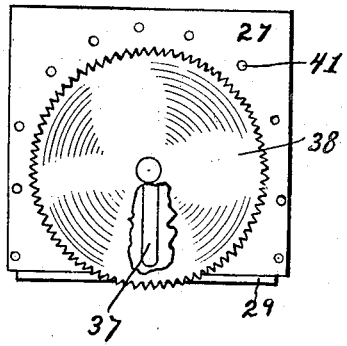
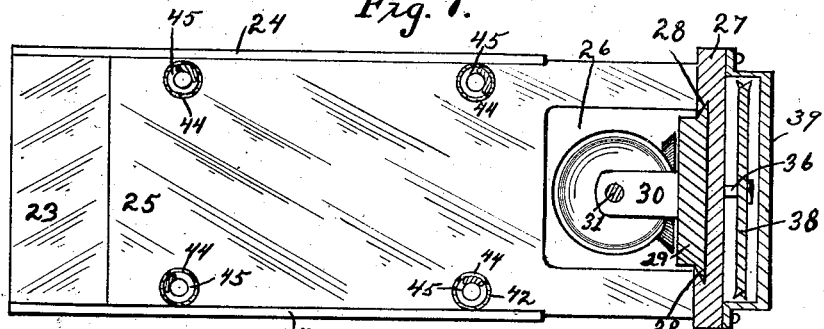
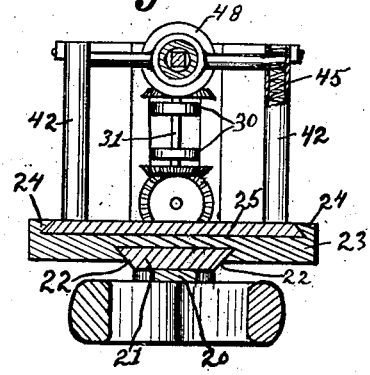
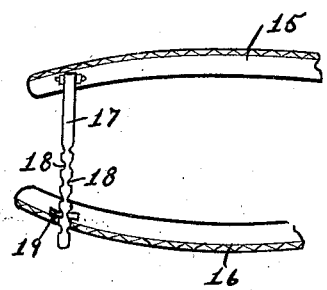
Witness.
Roy Kisor.
Inventor.
Frank Vogelzang
By Orwig + Bair. Attorneys.

UNITED STATES PATENT OFFICE.

FRANK VOGELZANG, OF ROCK VALLEY, IOWA.

DENTAL INSTRUMENT.

1,378,433.  Specification of Letters Patent.  Patented May 17, 1921.

Application filed August 6, 1920. Serial No. 401,700.

*To all whom it may concern:*

Be it known that I, FRANK VOGELZANG, a citizen of the United States, and a resident of Rock Valley, in the county of Sioux and State of Iowa, have invented a certain new and useful Dental Instrument, of which the following is a specification.

The object of my invention is to provide a dental instrument, whereby a tooth having several roots, which are embedded in the gums may be cut apart for easy extraction, the device being of simple, durable and inexpensive construction.

Still a further object is to provide in such a device, a tooth engaging member and a saw blade capable of being moved to various positions and adapted to saw the tooth in two, whereby each part may be extracted separately, thus preventing the roots from causing soreness to the gums.

It will be understood that with the ordinary forceps when teeth are extracted, which have roots substantially as shown in Figure 1 of the drawings, it causes a great amount of pain, due to the pulling upwardly of the roots. By my device, the tooth is first gripped by the forceps and then the saw or cutting mechanism is moved to position directly above the tooth and then lowered until the saw engages the tooth, whereby it will cause the tooth to be severed or cut in two, thus making it possible to easily extract each portion of the tooth without any great amount of pain.

Still a further object is to provide in such a device, in combination with a pair of forceps and a cutting blade mechanism, which is longitudinally adjustable and also vertically adjustable, whereby the device may be used upon teeth of various sizes or in various positions.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Fig. 1 shows a side elevation of my device, as applied to the tooth, the cutting mechanism being shown in dotted lines in its lowered position.

Fig. 2 shows a top view of the same.

Fig. 3 shows a detail view of the forceps and the bar on which the cutting mechanism is slid.

Fig. 4 shows a central, sectional view taken through the drive shaft, showing the flexible driving mechanism.

Fig. 5 shows a central, sectional view taken on line 5—5 of Fig. 1, showing the means for transmitting power from the flexible shaft to the cutting saw blade.

Fig. 6 shows a detail view of the locking device for holding the forceps fixed to a tooth.

Fig. 7 shows a horizontal, central, sectional view, taken on the line 7—7 of Fig. 1.

Fig. 8 shows a side elevation of the cutting blade, the casing or guard being removed; and Fig. 9 is a front elevation showing the manner in which the device is applied to a tooth.

In the accompanying drawings, I have used the reference numeral 10 to indicate the ordinary hand forceps, which are provided with the downwardly and inwardly extending portion 12 near its forward ends.

The tooth is indicated by the reference numeral 13.

The forcepts 10 are pivoted at 14 and are provided with the handle members 15 and 16. Pivoted to the handle member 15 is the link 17, which is provided with notches 18. The notches 18 are received between the upwardly extending lugs 19, holding the handle members against any movement relative to each other.

The tooth engaging members 12 are placed around the tooth, as illustrated in Fig. 9, and then the handle members 15 and 16 are tightened as much as possible by the operator, then the link 17 is moved to position where the notches 18 will register with the lugs 19, thus holding the tooth engaging members postively fixed to the tooth 13.

Fixed to the pivot 14 and extending rearwardly therefrom is the narrow arm 20 on which is fixed the guide device 21, which is provided with inclined sides 22. Slidably mounted on the guide devices 21 is the supporting member 23, which is provided with ribs 24 along each of its sides. The ribs 24 are inclined, so as to receive the correspondingly inclined sides of the slidable member 25, which is mounted on the support 23.

The slidable member 25 forms a bed on which the cutting mechanism may be moved longitudinally and also permits the cutting blade to be moved vertically thereon.

Near the forward edge of the slidable member 25 an opening 26 is provided, so that the cutting mechanism may move therethrough. Fixed to the forward edge and adjacent to the opening 26 of the slidable member 25 is the vertical flange 27, which is provided with the guide portions 28.

Slidably mounted within the guide portions 28 is the adjustable member 29, which has fixed to it a pair of rearwardly extending arms 30, in which is journaled the vertical shaft 31. Fixed to the upper end of the vertical shaft 31 is the beveled gear 32, which is in mesh with the beveled gear 33.

The lower end of the shaft 31 is provided with a beveled gear 34, which is in mesh with the beveled gear 35 on the shaft 36. The shaft 36 has one of its ends fixed to the beveled gear 35, and is extended through the elongated slot 37 in the frame member 27.

The free end of the shaft 36 has fixed to it, the cutting or saw blade 38. A casing 39 is provided, which has its lower end open, which substantially covers the blade 38 and is fixed to the frame 27 by means of the rivets 40, which extend into the openings 41 of the frame 27.

Fixed to the slidable member 25 adjacent to the ribs 24 are the four hollow up-right posts 42, which are connected together by means of the bar 43, which has its extreme forward end fixed to the frame 27. Each of the hollow posts 42 is provided on its inner adjacent surfaces with a slot 44.

Received within the hollow posts 42 are the springs 45 extended across the slidable member 25 and received within the slots 44 of the posts 42 are the cross pieces 46, which are held in the upper portion within the slots 44 by means of the springs 45.

In order to limit the upward movement of the cross-pieces 46, the pins 47 are provided within the posts 42 for that purpose.

The cross pieces 46 have formed intermediate of their ends, the enlarged or bearing portion 48, in which is mounted the hollow casing 49. Within the casing 49 is the main operating or drive shaft 50, which is fixed to the beveled gear 33.

Extending rearwardly from the casing 49 is the ordinary flexible casing 51, which is provided with the flexible shafting 52, which is of the ordinary type.

In order to hold the flexible casing 51 to the casing 49, I have provided the hook member 53, which has one end received within an opening within the casing 49 and its other end received within the flexible casing 51.

The flexible shafting 52 is fixed to any suitable source of energy, whereby the shaft 50 may be rotated. The rotation of the shaft 50 imparts rotation to the vertical shaft 30 through the beveled gears 32 and 33. Rotation is imparted to the shaft 36 from the vertical shaft 30 by means of the beveled gears 34 and 35, thus imparting rotary movement to the saw blade 38.

Fixed to the casing 49 and between the cross pieces 46 is the thumb rest 54, the purpose of which will be hereinafter more fully set forth.

When the operator handles the device, he engages the handle members 15 and 16 with the palm and fingers of his hand and places his thumb upon the thumb rest 54. It will be understood that the springs 45 within the posts 42 tend to hold the casing 49 in its uppermost position, but the operator may by imparting pressure to the thumb rest 54 move the parts downwardly against the action of the springs 45.

Fixed to the forward end of the casing 49 and extending forwardly therefrom are the bowed arms 55, which have their forward ends fixed to the adjustable member 29, which is capable of vertical adjustment or movement.

It will be understood that when the operator desires to move the cutting mechanism downwardly or into operative position, as is shown in dotted lines in Fig. 1 of the drawings, pressure is exerted on the thumb rest 54, which will cause the parts to move downwardly, the bowed arms 55 causing the vertical adjustable member 29 to move downwardly, thus carrying with it the entire cutting mechanism.

It will be seen that longitudinal movement of the cutting mechanism relative to the forceps is permitted by means of the guides 22 and the slidable members 25.

This makes it possible to move my device longitudinally and adjust it, so that the cutting blade may be placed directly above the tooth desired to be extracted.

When the cutting blade is in this position, then by exerting pressure to the thumb rest 54, the parts are moved downwardly, so that the rotating cutter blade will cut the tooth into several parts. When the tooth is cut in several parts, it is then easy to extract each portion separately, even though the roots are of the curved type, substantially as is illustrated in Fig. 1 of the drawings.

The advantages of my device are that I am able to quickly and readily adjust the saw blade, so that it will center directly above the tooth desired to be extracted, or it may be moved to inoperative position by releasing the pressure on the springs 45 and then sliding the entire cutting mechanism on the guide 22.

It will be understood that the member 23 may slide on the guide device 22, while the slidable member 25 may slide upon the member 23. This gives me a finer degree of adjustment or movement, so that the device may be moved and used upon teeth in various positions.

By providing the casing 39, I am able to prevent the saw blade from coming in contact with the patient's mouth and causing any serious injury.

The members 12 are also curved in such a manner that they will form a sort of shield while cutting the tooth, being so arranged that the saw will pass between the upper ends of said members.

The shoulders 11 of the members 12 are so arranged that they will engage the sides of the tooth while the points 11ª will enter between the roots and beneath the crown portion of the tooth, thereby forming a very rigid and effective clamp whereby the saw mechanism may be held steady while in operation.

Some changes may be made in the construction and arrangement of the different parts of my improved device, without departing from the real spirit and purpose of my invention, and it is my intention to cover by my claims any modified forms of structure or use of mechanical equivalents which may be reasonably included within their scope.

I claim as my invention:

1. In a device of the class described, in combination with a pair of forceps, adapted to engage a tooth, a tooth cutting blade capable of vertical movement, means for imparting rotary movement to said blade, and means whereby said blade may be moved to inoperative position away from the tooth.

2. In a device of the class described, in combination with a pair of forceps, adapted to engage a tooth, a tooth cutting blade capable of vertical movement, means for yieldingly holding the blade at one limit of its vertical movement, means for imparting rotary movement to said blade, and means whereby said blade may be moved to inoperative position away from the tooth.

3. In a device of the class described, a tooth engaging member having a frame fixed thereto, an auxiliary frame slidably mounted thereon, a cutting blade on said auxiliary frame and capable of vertical movement relative to said auxiliary frame and adapted to slide therewith, means for yieldingly holding said blade at one limit of its vertical movement, and means for moving the blade to cutting position.

Des Moines, Iowa, June 7, 1920.

FRANK VOGELZANG.